UNITED STATES PATENT OFFICE.

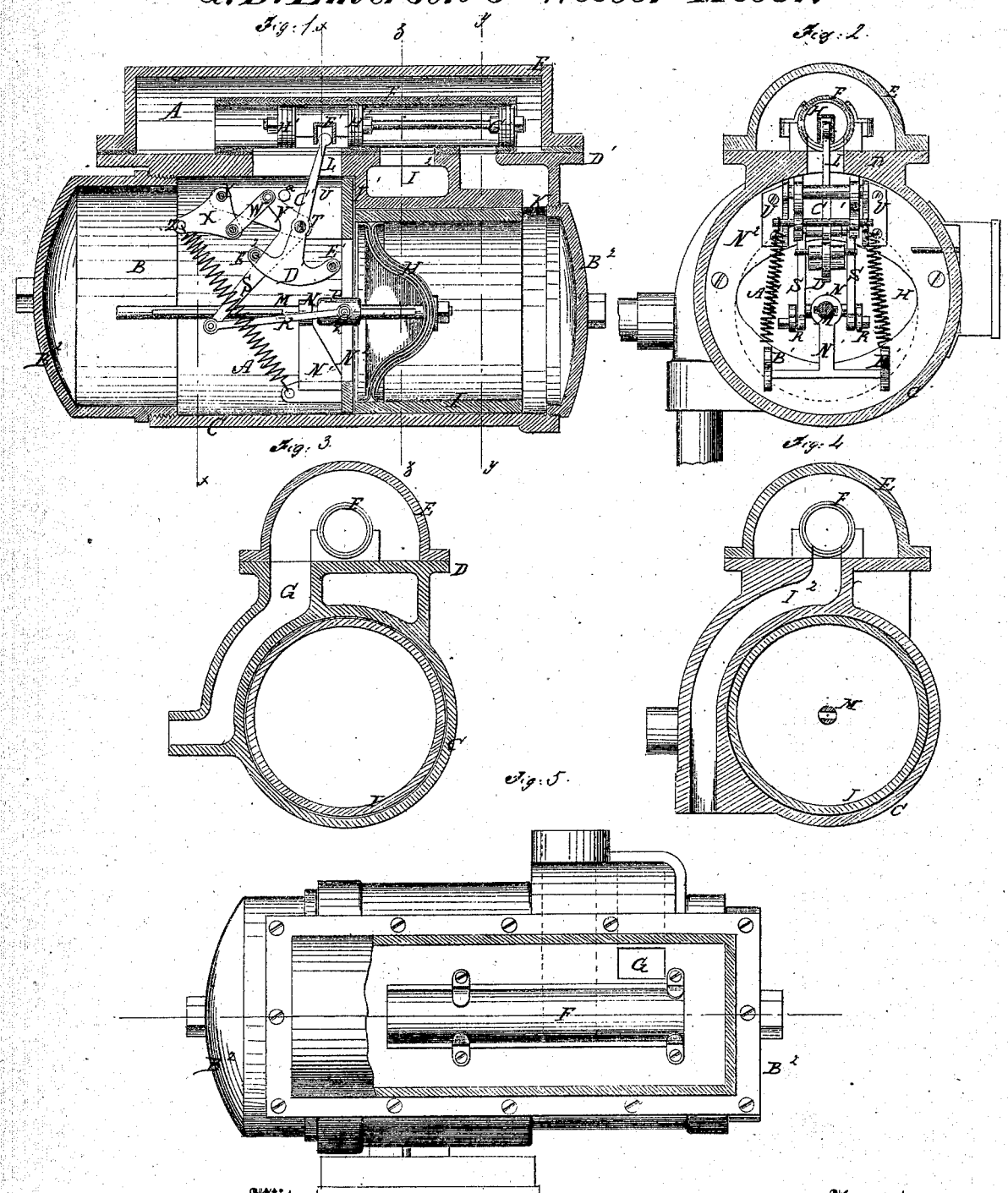

ACHILLE EXTEIN AND JESSE C. MILLS, OF SPRINGFIELD, MASSACHUSETTS.

IMPROVEMENT IN MUSIC-LEAF HOLDERS.

Specification forming part of Letters Patent No. 116,577, dated July 4, 1871.

*To all whom it may concern:*

Be it known that we, ACHILLE EXTEIN and JESSE C. MILLS, of Springfield, in the county of Hampden and State of Massachusetts, have invented a new and Improved Leaf-Holder; and we do hereby declare that the following is a full, clear, and exact description thereof, which will enable others skilled in the art to make and use the same, reference being had to the accompanying drawing forming part of this specification.

This invention has for its object to provide a simple and convenient holder for music and other purposes, whereby the operator is enabled to turn the leaves of music or other pages with great facility and certainty.

Figure 1 is a front view of our improvement attached to the leaf of a book. Fig. 2 is a side elevation of the same, showing the manner in which the device is secured to the leaf. Fig. 3 is a perspective view of our device, showing its peculiar form.

Similar letters of reference indicate corresponding parts.

Our improved holder is composed preferably of a single piece of wire, bent as shown, and surmounted by a knob or weight, A, covered by a ring of rubber or other substance, B, to prevent injury by the accidental fall of the holder. The wire is bent outward at right angles at *a* from the knob, then downward at *b*, returning upward and forming a loop at *c*, then bending inward toward the knob A and downward at *d*, ending in a spring and hook, *e*, as shown in Fig. 2.

In using our holder the leaf to be turned is clasped between the hook *e* and loop *c*, as shown, the crook *f* resting meanwhile on the cover of a book, or upon the edges of the several other leaves, or upon any other suitable support. To turn the leaf thus held the knob A is seized between the thumb and forefinger of the hand.

Having thus described our invention, we claim as new and desire to secure by Letters Patent—

1. As an improved article of manufacture, a leaf-holder, made substantially as herein shown and described.

2. The combination of an elastic cover, B, with the knob A, substantially as and for the purpose herein set forth.

3. The crook *f* and the spring *e*, made and operating substantially as described, for the purpose of holding up and clasping the leaf.

ACHILLE EXTEIN.
JESSE C. MILLS.

Witnesses:
J. W. BROWNE,
M. P. KNOWLTON.